(No Model.)

J. VERITY.
CONSTRUCTION OF COUPLINGS FOR SCREW PROPELLERS.

No. 527,632. Patented Oct. 16, 1894.

Witnesses
G. H. Stockbridge
C. L. Belcher

Inventor
John Verity,
By his Attorney
Charles M. Catlin.

UNITED STATES PATENT OFFICE.

JOHN VERITY, OF BRAMLEY, ENGLAND.

CONSTRUCTION OF COUPLINGS FOR SCREW-PROPELLERS.

SPECIFICATION forming part of Letters Patent No. 527,632, dated October 16, 1894.

Application filed June 17, 1893. Serial No. 478,031. (No model.) Patented in England August 28, 1893, No. 16,189.

*To all whom it may concern:*

Be it known that I, JOHN VERITY, a subject of the Queen of Great Britain and Ireland, residing at Bramley, in the county of York, England, have invented new and useful Improvements in the Construction of Couplings for Screw-Propeller or other Shafts, (patented in Great Britain August 28, 1893, No. 16,189,) of which the following is a full, clear, and exact description.

My improvements have reference to the construction of couplings for sectional screw propeller and other shafts, and consist in so connecting the shaft sections together that on any unequal wear taking place in their bearings, or should the shafts become strained or bent, or out of line with each other, such coupling will compensate for the same and allow the shafts to revolve freely without excessive friction of the bearings or strain upon such shafts.

Figure 2:
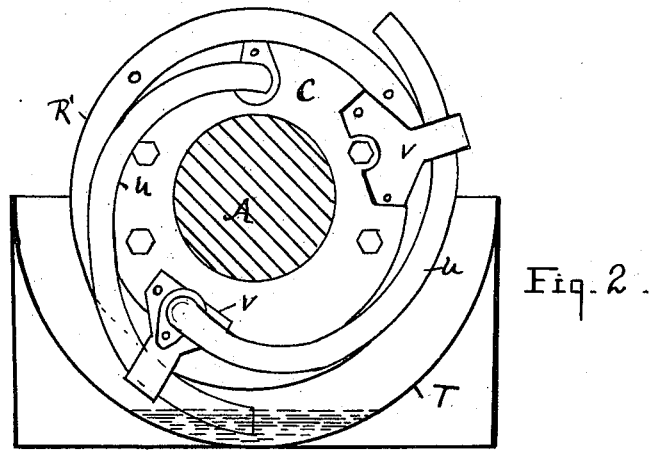
Figure 3:
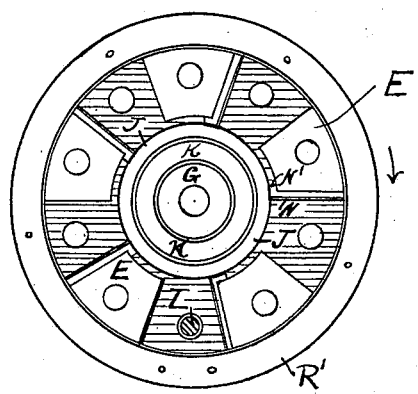
Figure 4:
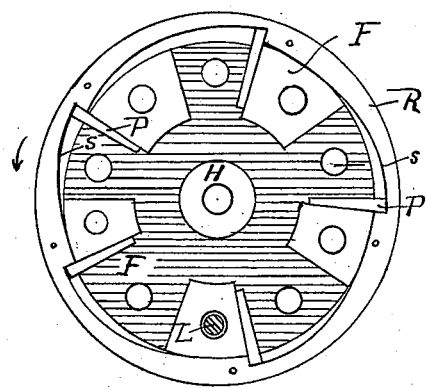
Figure 1:
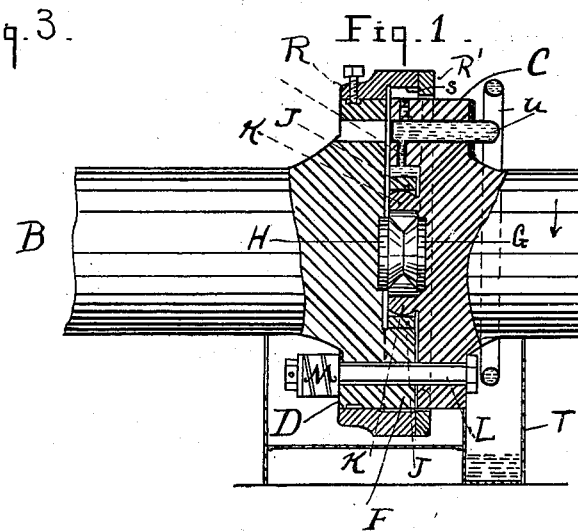

In the accompanying drawings Figure 1 shows a central section of my coupling uniting two sections of a shaft. Fig. 2 is an end view of the shaft and coupling looking from the right of Fig. 1. Fig. 3 is a face view of the coupling disk on the driving section A; and Fig. 4 is a similar view of the coupling disk on the driven shaft section B.

On the end of each shaft section A and B are formed the disks or flanges C and D, the end faces of which disks or flanges are provided with the jaws E and F which engage with each other, and transmit the rotary motion of one shaft to the other.

In order to take the end thrust of the propeller, and to prevent the respective shaft ends from fully engaging with each other, allowing thereby the respective jaws freedom to move a little farther into and out of gear each revolution when the two shafts or sections A and B are revolving at an angle to each other, center pieces G and H are inserted into the end of each shaft.

In order to retain the axis or ends of the shafts A and B concentric with each other, a ring J is fixed within the projecting jaws on the shaft B, into which is passed the reduced projecting end K of the shaft A. The periphery of the projecting end K is made convex, so that it can move freely in the ring J when the shafts are revolving at an angle to each other.

In order to keep the center pieces G and H in contact, bolts L are passed through both disks C and D, fitting loosely in their bolt holes, and under the head of each bolt L is provided a spring washer M, (Fig. I.)

By the above arrangement, the parts are kept together. At the same time the spring washers admit of movement of the disks when the shafts are revolving in any irregular or angular manner.

In order to reduce friction to a minimum I place parallel pieces N, slightly rounded on one or both faces, between the driving ahead faces of the jaws on the driving shaft, and the driven ahead faces of the jaws of the driven shaft. These pieces N are lipped onto the jaws at the bottom as shown at N' for the purpose of keeping them in position while the shafts are in motion.

For taking up the backlash and compensating for the wear on the driving faces of the jaws, adjustable taper pieces P are fitted between the driving astern faces of the jaws on the driving shaft, and the driven astern faces of the jaws on the driven shaft. Each wedge piece is adjusted and held in position by means of a ring R, which is fitted on the flange or disk of the shaft B, and on part of the interior circumference of such ring are formed the internal cams S, corresponding with the number of wedge pieces. The cams S are in contact with the outer ends of the wedge pieces, so that by turning the ring R round, the wedge pieces can be adjusted and retained in position. The ring R after being adjusted to any required position is held by bolts, screws or other convenient means. A ring R' surrounding disk C loosely is secured to ring R. It will be understood that the jaws or projections on each part C, D, are preferably arranged at regular intervals, and in such manner that the projections F fit into the spaces between projections E, and vice versa, the spaces between the projections or jaws, however, being wide enough to receive also the pieces N and wedges P. Preferably bolt holes are made through all of the jaws E and F. Only one bolt is indicated in position in Figs. 3 and 4, and some of the bolts are omitted in Fig. 2. As shown in Fig. 1, the oil tube extends into one of the bolt holes in disk C.

For the purpose of lubricating the coupling I provide an oil tank T below or under the coupling, and attach a curved tube U to the coupling by the bracket V. In moving round with the coupling, the tube U dips into the oil or lubricant and takes up a quantity thereof, which passes down such tube onto the working parts of the coupling, thus effectually lubricating same.

I claim as my invention—

1. The combination of shaft sections end to end, a yielding coupling connecting the sections, and center pieces G, H, between the ends of said shaft sections to receive the end thrust.

2. The combination of shaft sections end to end, a yielding coupling connecting the sections, and consisting of flanges C, D, on the meeting ends of the sections, jaws on the adjacent faces of said flanges, adapted to engage with each other, and means at the center of the shaft sections to receive the end thrust, at the same time preventing entire engagement of the jaws, whereby the shaft sections can assume a slight angle to each other without undue strain.

3. The combination of shaft sections meeting end to end, a yielding coupling therefor, and means engaging with both sections and holding them concentric.

4. The combination of shaft sections meeting end to end, a yielding coupling therefor, and a ring J surrounding a projection K on one shaft section and engaged by suitable parts of the other section, to hold the sections concentric.

5. The combination of shaft sections A, B, flanges C, D, connecting bolts therefor, means at the center of the shaft sections to receive the end thrust, the projection K having a rounded surface, the ring J surrounding said projection and engaged by suitable parts on the other shaft section.

6. The combination of shaft sections end to end, flanges C, D, thereon, jaws E, F, on the flanges and adapted to engage each other, means at the center to receive the end thrust, and wedges P between the jaws.

7. The combination of shaft sections end to end, flanges C, D, thereon, jaws E, F, on the flanges, wedges P between the jaws, and a cam ring R adapted to hold the wedges in place.

8. The combination of shaft sections end to end, flanges C, D, thereon, jaws E, F, on the flanges and adapted to engage each other, and friction reducing pieces N between the advance or driving ahead faces of the jaws E and the reverse or driven faces of the jaws F.

9. The combination of shaft sections end to end, a yielding coupling therefor, whereby the shafts can move out of line without undue strain, means at the center of the sections to receive the end thrust, and means for automatically introducing oil between the meeting ends of the sections.

10. The combination of shaft sections end to end, a yielding coupling therefor, and an automatic oiling device.

11. The combination of shaft sections end to end, a yielding coupling therefor, a curved tube communicating with the space between the meeting ends, and an oil receptacle into which the opposite end of said tube dips as the shaft revolves, and serving to automatically convey oil into the coupling.

JOHN VERITY.

Witnesses:
EDWD. WHITELEY,
JOSH. HY. WHITAKER,
Solicitor's Clerks, Leeds.